United States Patent
Sandegren

(10) Patent No.: US 6,512,930 B2
(45) Date of Patent: *Jan. 28, 2003

(54) ON-LINE NOTIFICATION IN A MOBILE COMMUNICATIONS SYSTEM

(75) Inventor: Per-Arne Sandegren, Stockholm (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/000,929

(22) Filed: Dec. 30, 1997

(65) Prior Publication Data

US 2001/0044299 A1 Nov. 22, 2001

(51) Int. Cl.[7] .............................. H04B 7/00; H04Q 7/20
(52) U.S. Cl. ........................ 455/518; 455/422; 455/517; 455/519
(58) Field of Search ................................ 455/518, 444, 455/435, 458, 416, 517, 519, 425, 67.1, 67.7; 379/88.12, 207.05, 207.06, 207.07, 207.08

(56) References Cited

U.S. PATENT DOCUMENTS 5,329,578 A 7/1994 Brennan et al.
5,491,835 A * 2/1996 Sasuta et al. ................ 455/518

(List continued on next page.)

FOREIGN PATENT DOCUMENTS

| EP | 0631452 A1 | 12/1994 |
| GB | 2290675 A | 1/1996 |
| WO | WO92/14330 | 8/1992 |
| WO | WO93/03585 | 2/1993 |
| WO | WO97/13382 | 4/1997 |

OTHER PUBLICATIONS

Stroud's Winsock Press release pp 1–6, Jan. 14, 1997.*
Printout of information called "What is ICQ", obtained no later than Oct. 20, 1997 from Internet web site http://www.mirabilis.com/whatisicq.html.
Printout of information called "Guided Tour—Products' Features", obtained no later than Oct. 21, 1997 from Internet web site http://www.mirabilis.com/productsfetaure.html.

*Primary Examiner*—William Trost
*Assistant Examiner*—Simon Nguyen

(57) ABSTRACT

A system notifies a first user of a mobile communication device about status of other users in a mobile communications system. The system sends a signal from the mobile communication device to a service node in the mobile communications system. At the service node, a list is determined indicating other users that the first user wants to know the status of. The status of each of the other users on the list is then determined, and transmitted from the service node to the mobile communication device. The signal from the mobile communication device to the service node may be generated in response to the mobile communication device being powered on, and may itself include an indication that the mobile communication device has been powered on. Upon receipt of this indication, the service node may determine other lists in which the first user is listed, determine a corresponding other user for each of the other lists, and send a notification to each of the corresponding other users indicating that the first user has gone on-line. Users of communication devices may thereby be informed of updated status of other users they are interested in. Other types of status include indications of going off-line, present location, and whether a given user is associated with voicemail and/or e-mail services. The service node may be a home location register.

24 Claims, 9 Drawing Sheets

U.S. PATENT DOCUMENTS

| | | | |
|---|---|---|---|
| 5,530,914 A | * | 6/1996 | McPheters .................. 455/518 |
| 5,581,802 A | * | 12/1996 | Erickson et al. ........... 455/33.1 |
| 5,610,969 A | * | 3/1997 | McHenry et al. ........... 455/435 |
| 5,627,881 A | * | 5/1997 | Fletcher ..................... 455/444 |
| 5,752,196 A | * | 5/1998 | Ahvenainen et al. ....... 455/518 |
| 5,758,291 A | * | 5/1998 | Grube et al. ................. 455/518 |
| 5,850,611 A | * | 12/1998 | Krebs ......................... 455/518 |
| 5,889,839 A | * | 3/1999 | Beyda et al. ............ 379/88.12 |
| 6,088,589 A | * | 7/2000 | Valentine et al. ........... 455/433 |

\* cited by examiner

ON-LINE NOTIFICATION IN A MOBILE COMMUNICATIONS SYSTEM

BACKGROUND

The present invention relates to mobile communications systems, more particularly to services that are provided to users of a mobile communications system, and even more particularly to techniques for informing a mobile communications system user of the status of other users in the system.

As the user base of wireless (mobile) communications systems continues to grow, so do the number and types of services that such systems can offer. No longer are mobile communication devices limited to providing just the traditional voice communication services. Instead, services such as paging, e-mail, general data transmission, chat-programs and even general purpose browsers are becoming more commonplace as devices such as Personal Digital Assistants (PDAs) and other types of intelligent mobile terminals are introduced into the marketplace.

One problem that currently exists in the mobile communication environment is the inability of a calling party to know whether an intended recipient of a phone call has his or her telephone "on-line" (i.e., switched on or within range), thereby enabling that intended recipient to answer/receive the call. Similar problems exist with respect to other types of communications as well, such as with a Short Message Service (SMS) message. In the case of an SMS-message, the calling party presently has no way of knowing whether the intended recipient is presently on-line, thereby increasing the probability that he will actually read the transmitted message now, or whether the intended recipient is presently off-line, thereby increasing the likelihood that the message will be read at some time in the (possibly) distant future.

The problem with this lack of information is that, whenever a person makes a call, it takes some seconds to dial the number, some more seconds for the system to call the B-party, and then still more seconds either for the B-party to answer or for the system to notify the calling party (the "A-party") that the user cannot be reached at the moment because, for example, the phone is not switched on. While the amount of time involved in making an uncompleted call might, at first, seem trivial, it can add up to a substantial number of minutes when one considers how many uncompleted calls are attempted in any given day. If the calling party were to know, ahead of time, that a call could not presently be completed, then the attempt would not be made and the time involved could be saved for more productive activities.

There are a number of solutions to this problem in the wireline Internet world. For example, a product called ICQ is a known Internet tool that provides information about who is on-line at any given time, and enables a user to contact these individuals. However, because of fundamental differences between the wireline Internet infrastructure and that which is found in the mobile communications world (e.g., cellular telephone environments), the known wireline-based solutions are not functional in the wireless world.

Therefore, it is desired to provide a mechanism for a calling party in a mobile communication system to know, ahead of time, whether an intended recipient of a call or other transmission is presently capable of receiving an anticipated call or other transmission.

SUMMARY

It is therefore an object of the present invention to provide systems and techniques for notifying mobile users of various status conditions associated with other mobile users.

The foregoing and other objects are achieved in systems and methods for notifying a first user of a mobile communication device about status of other users in a mobile communications system. In one aspect of the invention, such systems and methods include sending a signal from the mobile communication device to a service node in the mobile communications system. At the service node, a list is determined that indicates other users that the first user wants to know the status of. The status of each of the other users on the list is then determined, and the status is transmitted from the service node to the mobile communication device.

In another aspect of the invention, the sending of the signal from the mobile communication device to the service node in the mobile communications system is performed in response to the mobile communication device being powered on. The signal may further include an indication that the mobile communication device has been powered on, and at the service node, a determination may be made of other lists in which the first user is listed. For each of the other lists, a corresponding other user may be determined, and a notification may be sent to each of the corresponding other users indicating that the first user has gone on-line.

In one embodiment of the invention, the service node is a home location register.

In accordance with yet another aspect of the invention, the types of status may include any of the following: an indication of whether each of the other users on the list is on-line; an indication of whether each of the other users on the list is associated with a voicemail service; an indication of whether each of the other users on the list is associated with an e-mail service; and an indication of the location of each of the other users on the list. Other types of status may be indicated as well.

In still another aspect of the invention, transient conditions are inhibited from being reported as a user's status by waiting until a condition has continued to exist for a predetermined period of time before that user's status is updated to indicate the condition. Such transient conditions may include, for example, temporarily going off-line due to driving through a tunnel, or due to riding in an elevator.

BRIEF DESCRIPTION OF THE DRAWINGS

The objects and advantages of the invention will be understood by reading the following detailed description in conjunction with the drawings in which.

DETAILED DESCRIPTION

Figure 1C:
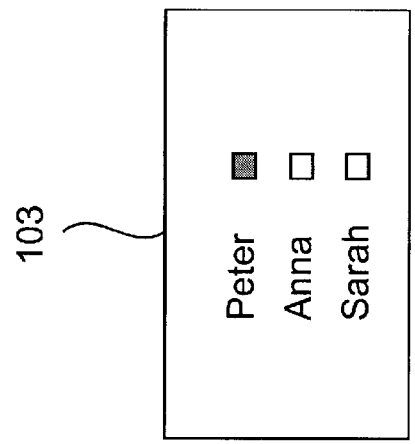
FIGS. 1a, 1b and 1c illustrate an exemplary wireless on-line notification service from a user's point of view, in accordance with one aspect of the invention.

The various features of the invention will now be described with respect to the figures, in which like parts are identified with the same reference characters.

Figure 1B:
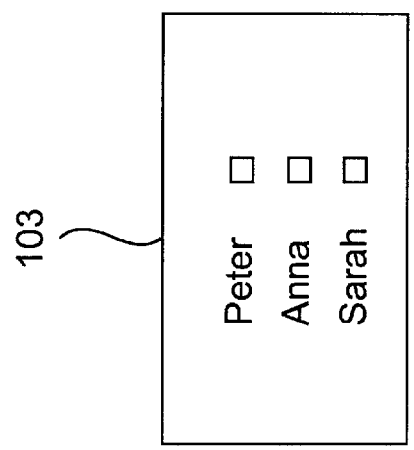
Figure 1A:
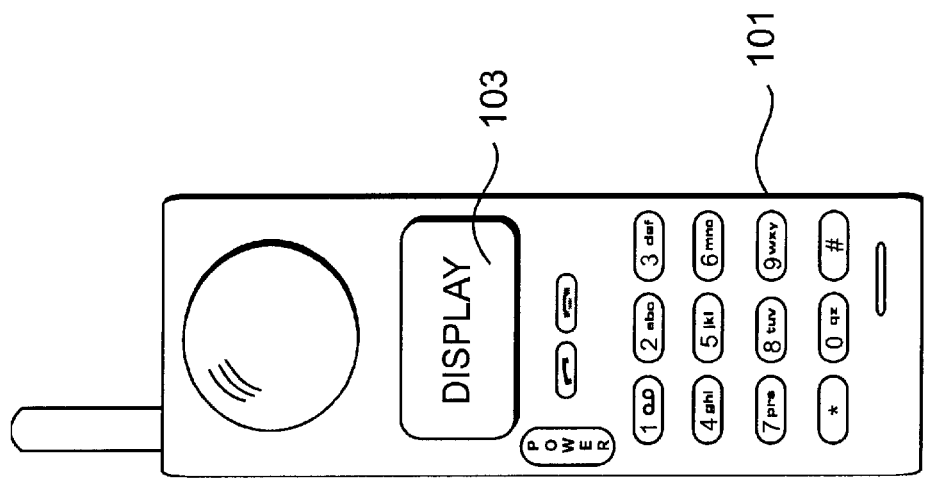

Exemplary Wireless On-Line Notification (WOLN) techniques and apparatuses will now be described. Referring first to FIGS. 1a, 1b and 1c, these illustrate an exemplary WOLN service as it might be seen from a user's point of view. In accordance with one aspect of the invention, the user has established a list of individuals whose status is of interest to him. This type of list will be referred to in this disclosure as a "Notify Me" list. The listed individuals may be potential recipients of a call, a data transmission, or virtually any other type of communication from the user. Merely for the sake of example, this "Notify Me" list will be assumed to include the names of three individuals: Peter, Anna and Sarah. Of course, the user could have predefined more or fewer individuals in the list. In operation, the user's wireless device, such as the mobile station (MS) 101 depicted in FIG. 1a, obtains information from a remote server (not depicted in FIG. 1a) that checks through the predefined "Notify Me" list and determines, for each of the listed individuals, whether they are presently capable of responding to an anticipated call or other transmission from the user. If so, this status is reflected on a display portion 103 of the MS 101.

FIGS. 1b and 1c are enlarged views of the display portion 103 of the MS 101, as seen at different stages of the WOLN service. In the example of FIG. 1b, the display portion 103 of the MS 101 indicates the names Peter, Anna and Sarah. Next to each name is a blank box, which is defined to indicate that the corresponding named individual is presently incapable of responding to any call (or other transmission) from the user. Armed with this knowledge, the user can save himself wasted efforts at trying to reach any of these individuals.

FIG. 1c depicts a situation in which the individual named Peter has just gone on-line (e.g., by turning on the power to his mobile device). In response to this situation, the remote server transmits this information to our user's MS 101, which responds by filling in the box associated with Peter's name in the display portion 103. The user now knows that Peter is capable of responding to any call or other transmission that the user may initiate. Of course, the use of blank or filled-in boxes to represent this information is merely an example, and other techniques for representing this information (such as including complete text) could easily be used instead.

Taking a high-level look at the WOLN application (which resides both in the user's device and in the remote server), it should perform the following tasks (not necessarily in the order indicated):

1) When the user (whose identity will henceforth be represented by the all-uppercase term "USER") turns on his wireless device, the wireless device notifies the server that USER has gone on-line.

2) The server then obtains the current status (e.g., "on-line", "not on-line") for each of the individuals defined in USER's "Notify Me" list (which is a list of other users that USER has previously defined and which is kept in a WOLN database). This information is transferred to USER's mobile device.

3) The server may also examine its WOLN database to identify which other lists include the names of this USER. Each of these other lists belongs to a corresponding other user. The server, therefore, notifies each of the other users who are presently on-line that "USER has gone on-line." The process of identifying which other lists include the names of this USER may be performed dynamically by examining each of the "Notify Me" lists in the system, and determining which of these include the USER's identity. The owners of these identified lists are then notified of USER's change in status. In an alternative embodiment, the processing involved in dynamically determining who to notify in the event of a user's change in status may be substantially reduced by creating and maintaining a second type of list, herein referred to as a "Notify Others" list. In such an embodiment, each user has his own "Notify Others" list in addition to the "Notify Me" list described above. The contents of the "Notify Others" list is a list of users who should be notified whenever a particular user's status changes. In the above example, USER's "Notify Others" list includes the identity of those other users whose own "Notify Me" lists include the identity of USER.

4) When USER turns his mobile device off, a notification of this event is sent to the server. The server responds by examining its WOLN database to identify which other "Notify Me" lists include the names of this USER. (In one embodiment, this task is greatly simplified by using the contents of USER's "Notify Others" list described above.) As mentioned above, each of these other "Notify Me" lists belongs to a corresponding other user. The server, therefore, notifies each of the other users who are presently on-line that "USER has gone off-line." Of course, when USER is on-line and one of the individuals on his predefined list goes off-line, this information may be similarly forwarded to USER's mobile terminal, so that USER can be kept apprised of the most recent status of the named associates.

Figure 2A:
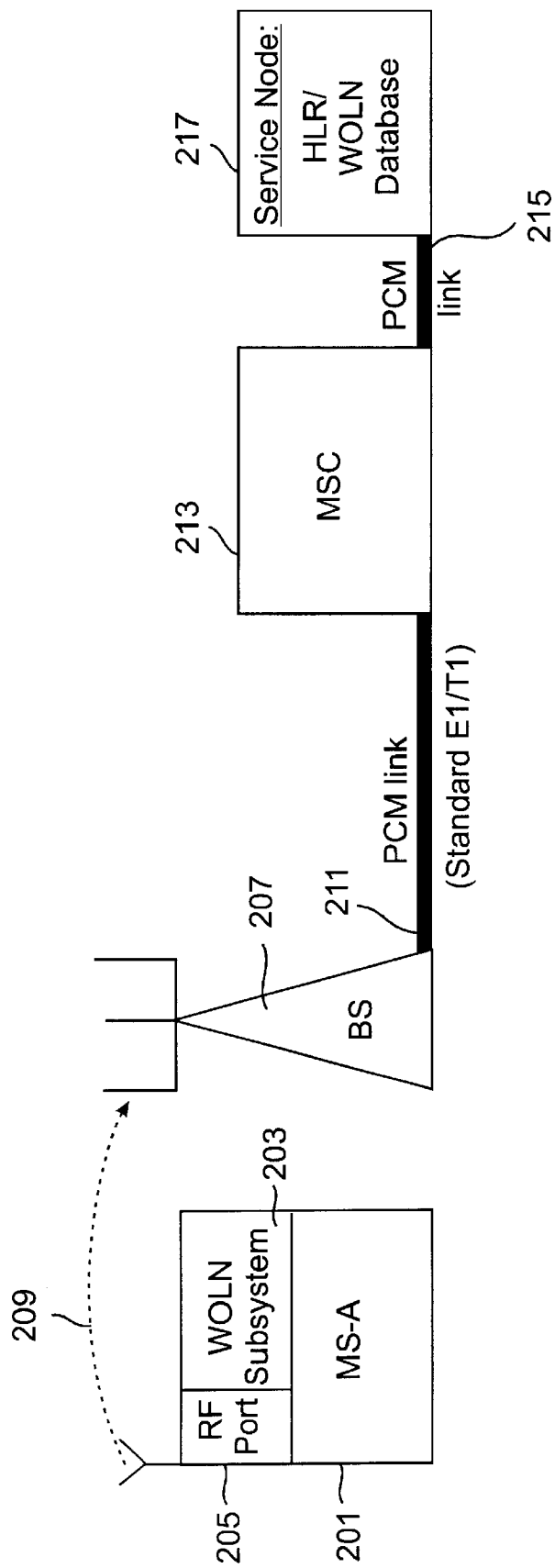
FIGS. 2a, 2b and 2c are block diagrams of exemplary embodiments of a system for effecting a wireless on-line notification service in accordance with several aspects of the invention.
Figure 2B:
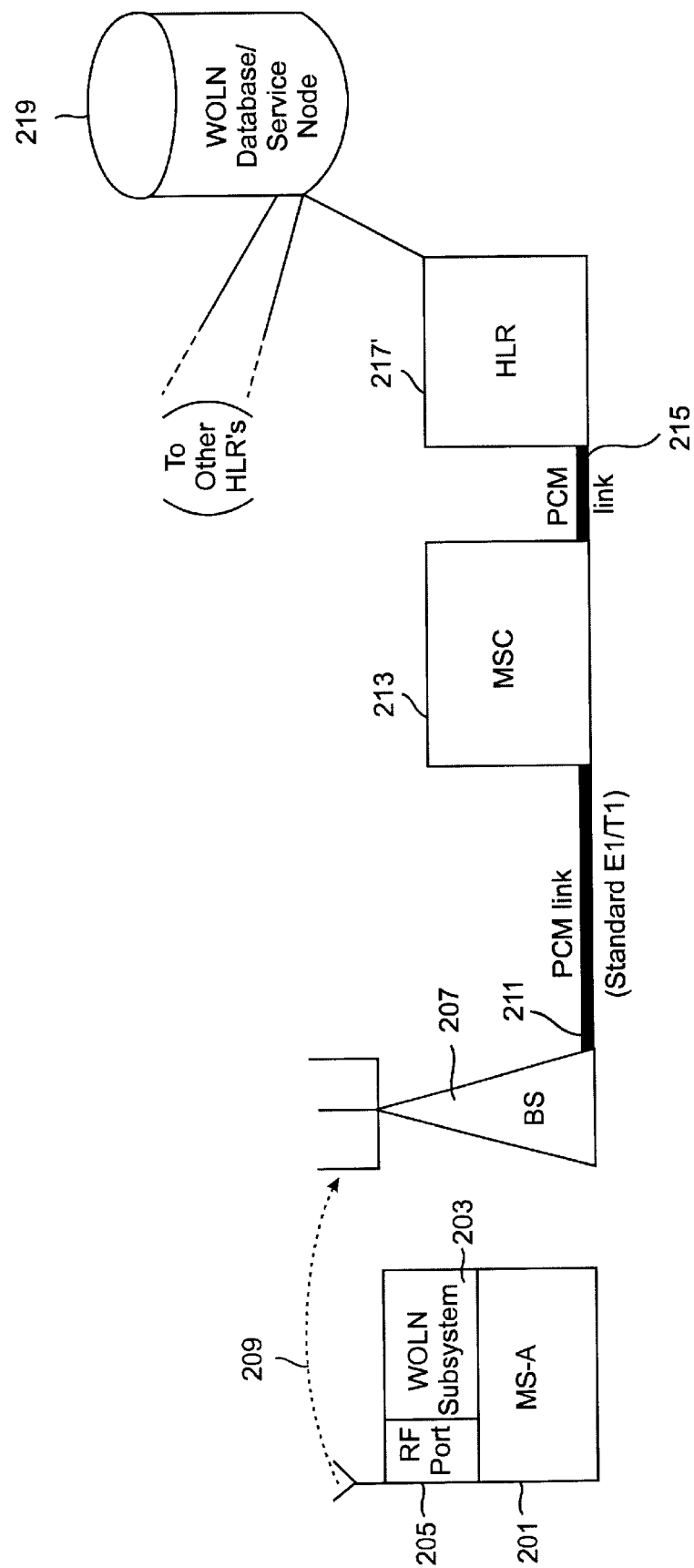
Figure 2C:
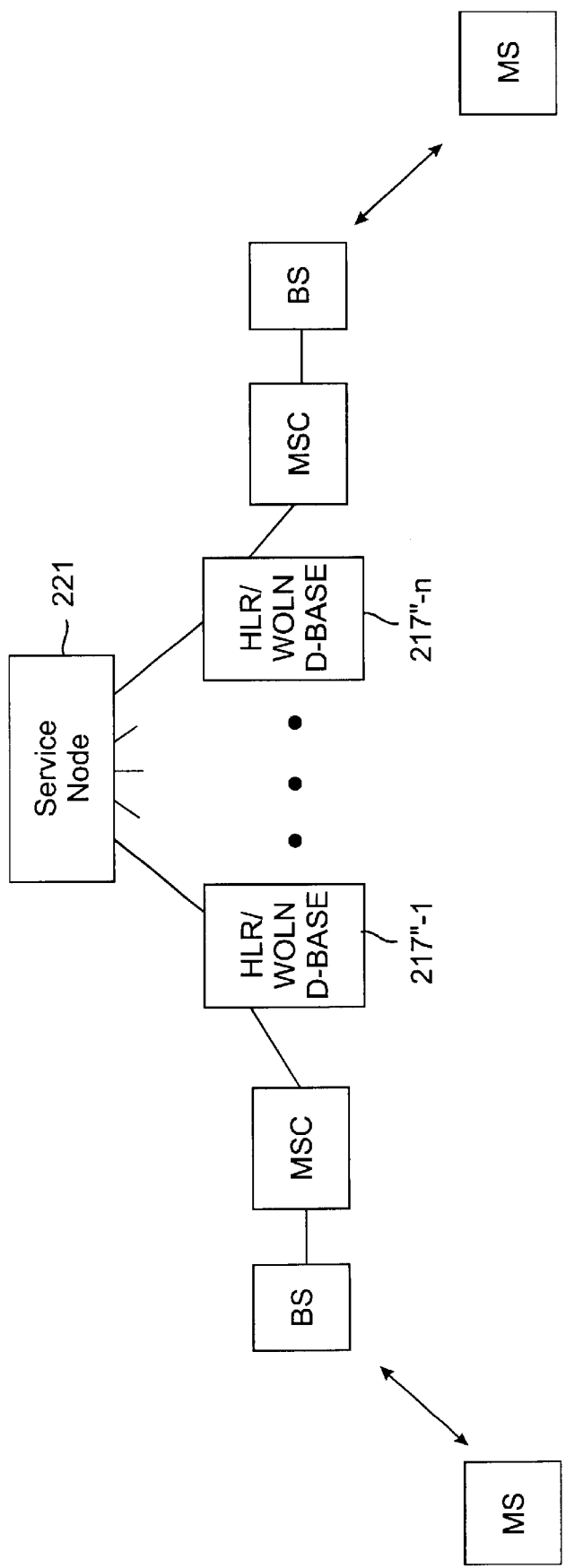

FIGS. 2a, 2b and 2c are block diagrams of exemplary embodiments of a system for effecting a WOLN service. The user's wireless device in these examples is a mobile station 201 (designated MS-A in the figures), but could easily be any other type of wireless device (e.g., a PDA) that includes appropriate hardware and software (WOLN subsystem 203) for working with the WOLN application. Referring first to an embodiment illustrated in FIG. 2a, the MS-A 201 includes a radio frequency (RF) part 205 for communicating with a base station (BS) 207 via an air interface 209 in accordance with known techniques that need not be described here in detail. The BS 207 is, in turn, coupled to a Mobile Switching Center (MSC) 213 by means of a pulse code modulation (PCM) link 211, which may be a standard EI/TI link. The MSC 213 is coupled to a second PCM link 215 for communication with a service node that, in this embodiment, is a combination Home Location Register (HLR)/WOLN database 217. (The indications of HLR's throughout this description is merely for illustrative purposes. Those having ordinary skill in the art will recognize that any equivalent equipment could be substituted for the indicated HLR's.) The BS 207, PCM links 211, 215 and MSC 213 are well-known in the art (e.g., in the Global System for Mobile communication (GSM)), and need not be described here in detail. Considering only the HLR functions of the combination HLR/WOLN database 217, these are also well-known, and need not be described here in detail.

The WOLN application is primarily supported by the WOLN subsystem 203 in the MS-A 201, and by the WOLN database portion of the service node (in this embodiment, the combined HLR/WOLN database 217). The WOLN subsystem 203 controls the MS-A's display portion 103, and sends and receives appropriate signaling (described in further detail below) to/from the WOLN database portion of the combined HLR/WOLN database 217. The intermediate elements in the system (e.g., the BS 207 and MSC 213) also support the WOLN application to the extent that they forward WOLN-related information between the MS-A 201 and the combined HLR/WOLN database 217. However, this function would be readily apparent to one having ordinary skill in the art, and will not be described here in detail.

The system illustrated in FIG. 2a permits an HLR to be used to provide all of the information needed to implement a WOLN service (i.e., the WOLN service node is within the HLR itself). The service provided by this embodiment is limited, however, in that it works only for terminals within the same HLR, which most commonly means users of the same operator. In order to provide the service among different operators, alternative embodiments are used. In one alternative, illustrated in FIG. 2b, a service node 219 is separate from the HLR 217'. The service node 219 includes all of the data and service node control software associated with the WOLN service, and is accessible to HLR's from many different systems. As a result, the WOLN service can inform users of the status of other users across system boundaries. The HLR 217' in this embodiment stores information pertaining to whether a given subscriber has the WOLN service in much the same way that it retains information about whether the subscriber has other services, such as call forwarding. However, the actual status information for a user (e.g., whether a user is on-line or not) as well as the various lists ("Notify Me" and possibly "Notify Others") are stored in the service node 219.

The embodiment of FIG. 2b has a drawback in that the service node 219 may become a huge database. This problem is addressed in another alternative embodiment, illustrated in FIG. 2c. Here, a plurality of combined HLR/WOLN databases 217"-1 . . . 217"-n operate as described above with respect to the combined HLR/WOLN database 217 of FIG. 2a, but in addition, are each connected to a superior service node 221, which passes on questions and information from one HLR/WOLN database to those of different operators. In this way, knowledge of the status of all users can be distributed throughout a number of separate systems. Logically, this looks very much like a global HLR, but requires much less equipment, and doesn't include the drawback of requiring a giant database, although some storage space is needed.

The WOLN-related signaling between the MS-A 201 and the service node (e.g., the combined HLR/WOLN database 217 of FIG. 2a, the service node 219 of FIG. 2b, or the combined HLR/WOLN database 217" of FIG. 2c) will now be described by way of several examples. In each of these, the "HLR" and "ServiceNode/WOLN Database" represent logical functions, and as such, are depicted as separate entities. However, as has been explained, these two logical functions may or may not physically reside in a common node.

Figure 3A:
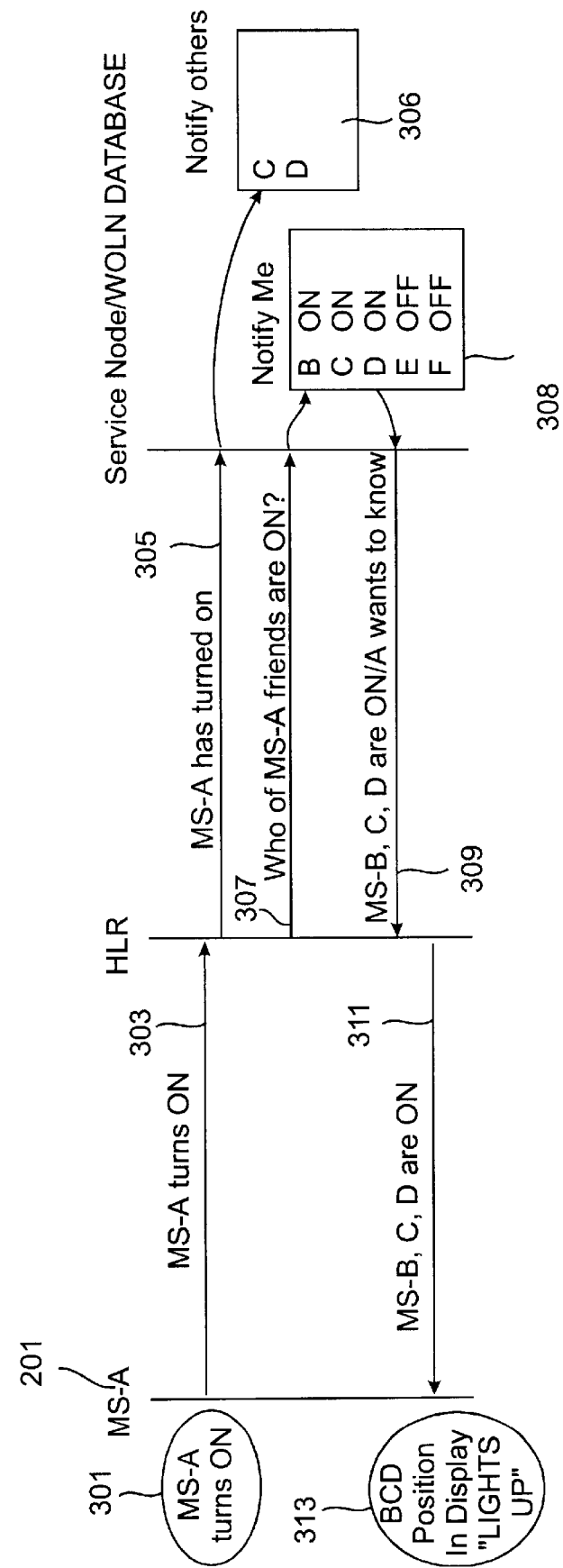
FIGS. 3a, 3b, 3c, 3d and 3e illustrate wireless on-line notification-related signaling between a mobile station and a service node in accordance with several aspects of the invention.

Referring first to FIG. 3a, a power-on sequence will be described. In response to the MS-A powering on (step 301), it sends a message communicating this fact to the HLR (step 303). The HLR then passes this information along to the service node (step 305), which responds by reporting this change in status to those other users who are designated in MS-A's "Notify Others" list 306. As explained earlier, the HLR stores an indication of whether or not a user subscribes to the WOLN service. If the user is a WOLN subscriber, the HLR sends a query to the service node regarding who of MS-A's associates ("friends") are presently on-line (step 307). In this example, the system node examines MS-A's "Notify Me" list 308, and consequently determines that friends B, C and D are on-line, and passes this information back to the HLR (step 309). The HLR, in turn, signals this information to the MS-A (step 311). The WOLN subsystem 203 in MS-A then causes the display portion 103 to indicate that friends B, C and D are on-line (step 313).

Figure 3B:
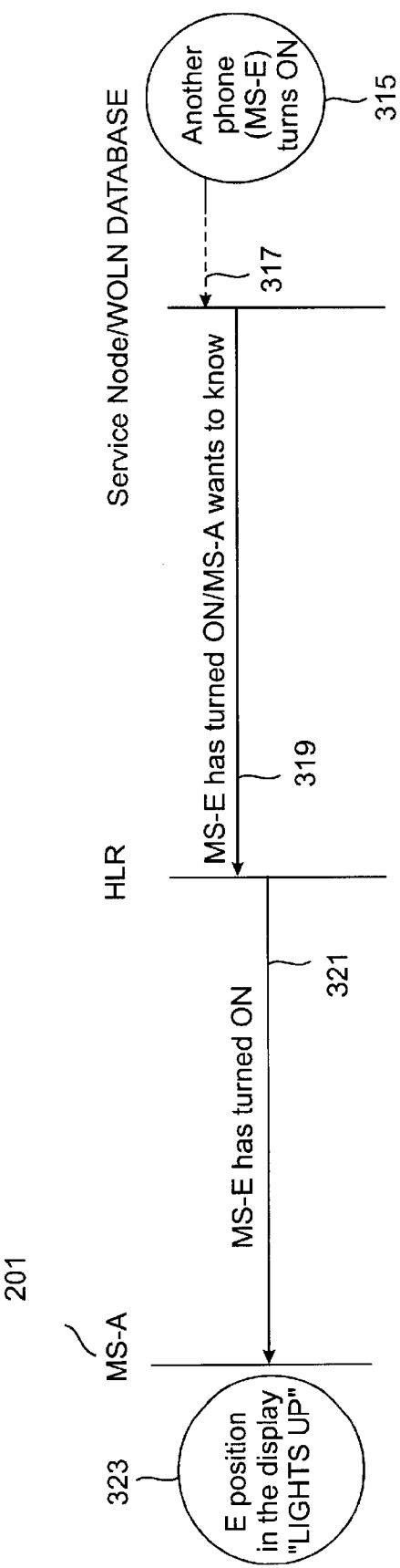

A user who is on-line may be informed of another user's change in status, such as that other user's coming on-line. The signaling associated with this example is depicted in FIG. 3b. Here it is assumed that MS-A is already on-line, and that another telephone (designated MS-E) turns on (step 315), belonging to a user "E" who is also on MS-A's "Notify Me" list. Because each of the MS's in this example follows the same principles, the service node is notified of MS-E's coming on-line (step 317) in much the same way that the service node was informed when MS-A was turned on. In addition to its further communication with MS-E (not shown), the service node recognizes that user E is on MS-A's list (e.g., by detecting that MS-A is listed on MS-E's "Notify Others" list (not shown)), and consequently sends a message to the HLR indicating that the MS-E has turned on and that MS-A wants to know this information (step 319). The HLR responds by sending a message to MS-A, telling it that MS-E has turned on (step 321). In response to receipt of this message, the WOLN subsystem causes the display portion 103 to indicate that user E is on-line (step 323).

Figure 3C:
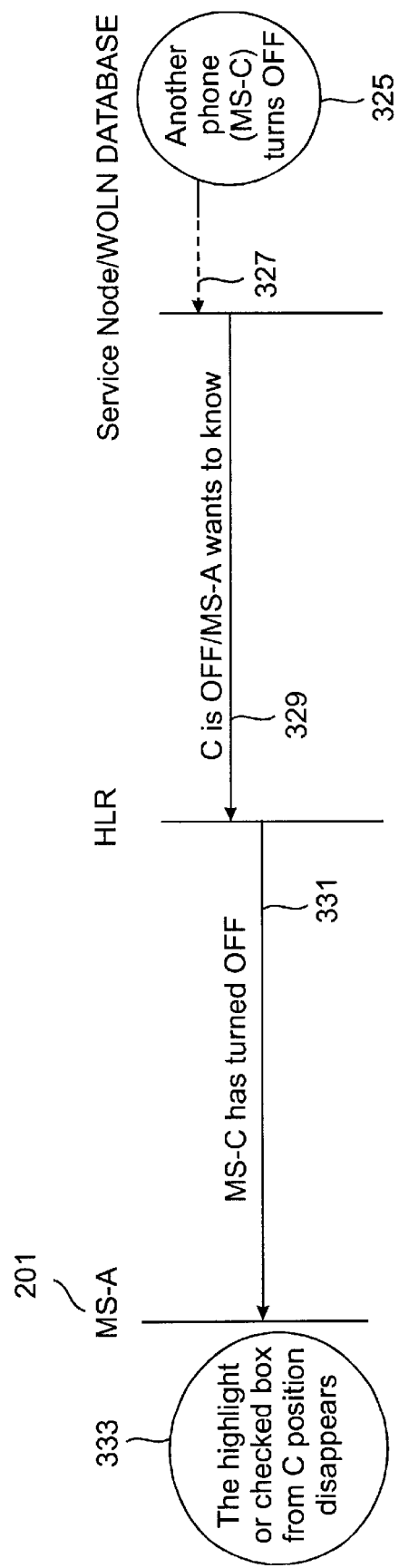

Another status change that may warrant notification is going off-line. The signaling associated with this notification is illustrated in FIG. 3c. Here, one of the mobile devices (MS-C) that user A is interested in goes off-line (step 325). This information is passed along to the service node (step 327), which recognizes that user C is on MS-A's list (e.g., by detecting that MS-A is listed on MS-C's "Notify Others" list (not shown)), and consequently sends a message to the HLR indicating that the MS-C has turned off and that MS-A wants to know this information (step 329). The HLR responds by sending a message to MS-A, telling it that MS-C has turned off (step 331). In response to receipt of this message, the WOLN subsystem causes the display portion 103 to indicate that user C is off-line (step 333).

Figure 3D:
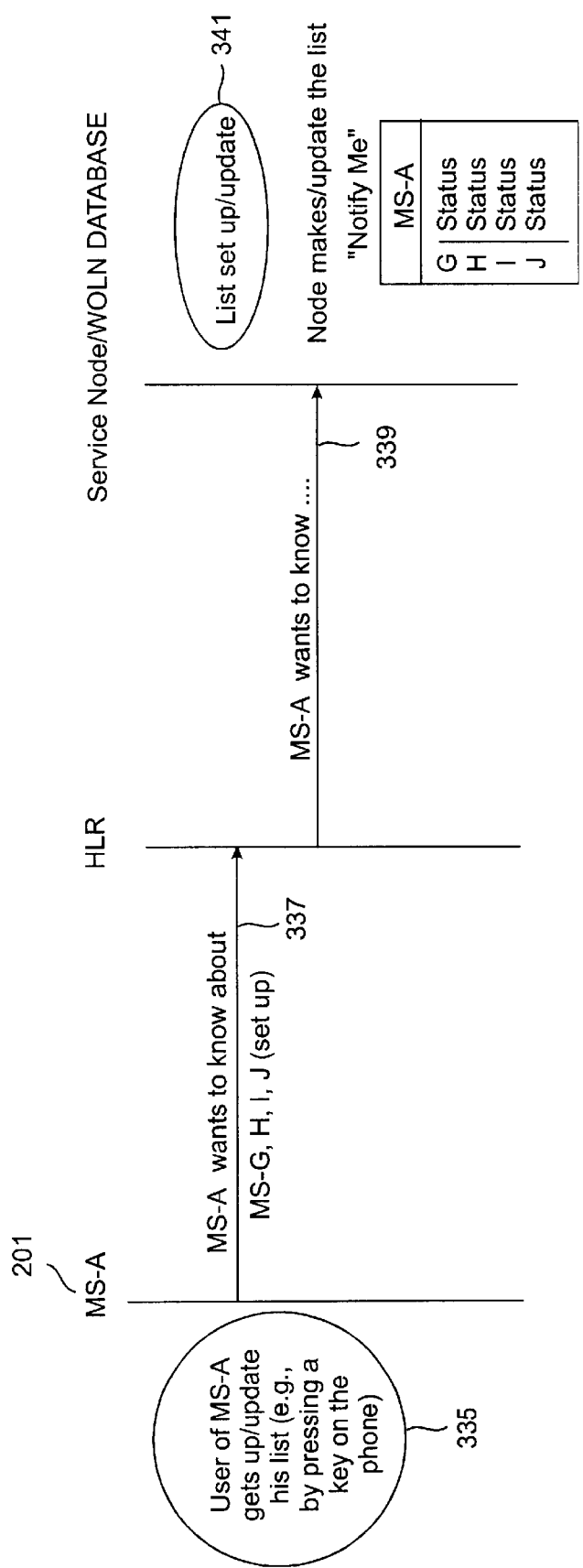
Figure 3E:
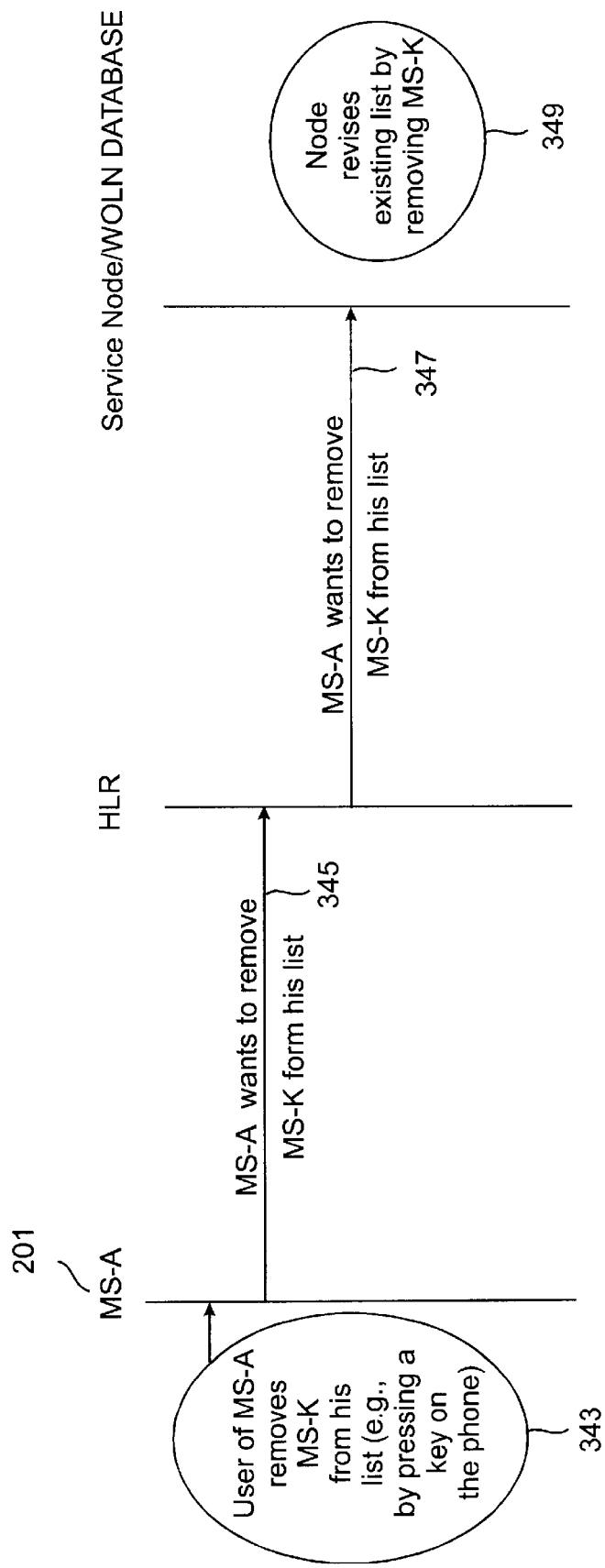

In addition to signaling associated with notifications, such as those illustrated above, there is also signaling associated with setting up and maintaining a list. In the signaling example of FIG. 3d, the user of MS-A 201 wants to build up his list of other users (i.e., his "Notify Me" list). He may indicate this by, for example, pressing an associated key or key combination on his telephone (step 335). Of course, other types of user input selection techniques, such as menu selection techniques, may be used as an alternative. His telephone (MS-A 201) allows him to enter the identities of the other users he wants to have in his initial list, or alternatively, to add to an existing list. In this example, the other users are designated G, H, I and J. The MS-A 201 sends a message to the HLR indicating that he wants to set up a list with MS-G, H, I and J in it (step 337). The HLR forwards this information to the service node (step 339). The service node responds by establishing a new "Notify Me" list designating MS-G, H, I and J, or alternatively, adding MS-G, H, I and J to an existing "Notify Me" list (step 341). In those embodiments employing a "Notify Others" list, the service node may further respond by locating the "Notify Others" lists respectively belonging to MS-G, H, I and J, and adding MS-A to each of these lists.

In a final signaling example, the user of MS-A wants to remove another user from his "Notify Me" list. He may indicate this by, for example, pressing an associated key or key combination on his telephone (step 343). Of course, other types of user input selection techniques, such as menu selection techniques, may be used as an alternative. In this example, the other user to be removed is designated K. The MS-A 201 sends a message to the HLR indicating that he wants to remove MS-K from the list (step 345). The HLR forwards this information to the service node (step 347). The service node responds by removing MS-K from MS-A's "Notify Me" list (step 349). In those embodiments employing a "Notify Others" list, the service node may further respond by locating the "Notify Others" list belonging to MS-K, and removing MS-A from this list.

The techniques and apparatus described above may be applied to implement a number of different variations of WOLN services. In a simple case, the WOLN service gives a user information about who is presently available to accept a call (or other transmission), thereby eliminating wasted efforts at reaching people who will not respond.

In another application, the WOLN service not only informs the user about who else is presently available to accept a call, but also indicates whether any of these individuals subscribe to, for example, a voicemail service. Armed with this knowledge, the user might call a person who is known to be off-line because the user knows that it is not a wasted effort—he can always leave a message. This additional service is relatively simple to implement because information about whether or not a person has voicemail already resides in the HLR in most cellular communications systems.

In yet another application, the WOLN service can provide information indicating whether a person has an e-mail service connected to his telephone, voicemail or SMS. With this knowledge, the user can decide to transmit a written message rather than attempting to establish a voice call.

Many other applications of the WOLN service are possible. For example, mobile communications systems are shortly expected to maintain information about the location of mobile subscribers. If a PDA with a large enough memory to store displayable maps were utilized, the WOLN service could supply information about a person's present whereabouts, and this information could be indicated graphically on a user's PDA.

In each of the above-described (and other) applications of the WOLN service, the system can provide security/confidentiality by giving each mobile subscriber the choice of being on another user's "Notify Me" list or not. The default can be set to "not permitting listing on another user's list", and each subscriber can override this default. It is also possible to provide an authorization function. If user A wants to have user B on his "Notify Me" list, then, before any lists are updated, a message is passed to user B asking whether this is acceptable. If user B accepts being named on user A's "Notify Me" list, then this permission is transmitted back to the service node which updates user A's "Notify Me" list accordingly. Otherwise, the service node will not permit user A to add user B to user A's "Notify Me" list.

Another consideration with respect to the WOLN service is how to implement the necessary signaling. Existing mobile phones can do this in several ways. One way is to utilize the control channel. However, this approach would probably get overloaded very soon. As an alternative, the SMS service could be used, because it does not require that many bytes be sent over the air interface. In future systems, the proposed schemes for packet data can advantageously be used because they are more efficient than present signaling methods, and can handle the capacity requirements.

Yet another consideration with respect to the WOLN service is that it can add a lot of signaling to the mobile communications system. Of course, one technique for addressing this concern is to build up the infrastructure capacity to cope with the increased load. Another approach is to modify the way the WOLN service operates from the user's point of view, so that the user orders a snapshot of his list of people. For example, the user might press a button or activate the "snapshot" function via a menu system in the phone (or PDA). When activated, the system returns data about the people on the list only once, instead of every time someone's status changes.

Another consideration, which is unique to the mobile environment, is how to handle the situation when someone who is on-line temporarily moves into a location having bad radio coverage (e.g., a road tunnel or an elevator). To the mobile communications system, it appears that this person has become unavailable. With the WOLN system as described above, this information would then be signaled to every other user whose "Notify Me" list includes this particular user. However, the mobile user soon becomes "available" again because his situation was just temporary (e.g, he leaves the tunnel or elevator). This subsequent change in status would again initiate a signaling activity to all those having this subscriber on their "Notify Me" list. It is apparent that the benefits of having instantaneous information about the user may not outweigh the burden that this extra signaling imposes on the system. As one solution to this problem, a reporting delay may be introduced to filter out transient changes in status. For example, when a mobile subscriber suddenly goes off-line, the system might wait, say, two minutes, after which time it checks to see whether the subscriber is still off-line. If he is, then his off-line status may be considered permanent enough to report to others. However, if he is back on-line, then no signaling is performed.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, a number of lists have been described with respect to exemplary embodiments. It will be apparent to those skilled in the art that these lists can be implemented in any number of ways without departing from the inventive concepts described above. For example, the "Notify Others" list has been described as a list that is associated with a particular user. However, alternative embodiments may be devised in which a master "Notify Others" list resides at a central cite, such as the service node 219 depicted in FIG. 2b. In such an embodiment, each list entry might be addressed by specifying a user of interest, and the entry itself would be the list of other users who should be notified of changes in status of the user of interest.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of notifying a first user of a mobile communication device about status of other users in a mobile communications system, the method comprising the steps of:
   sending a signal from the mobile communication device to a service node in the mobile communications system;
   at the service node, in response to receipt of the signal, determining a list of other users that the first user wants to know the status of;
   at the service node, determining the status of each of the other users on the list;
   transmitting the status of each of the other users from the service node to the mobile communication device, wherein the status of each of the other users includes an indication of whether the user is on-line or off-line to the mobile communications system, wherein the step of sending the signal from the mobile communication device to the service node in the mobile communications system is performed in response to the mobile communication device being powered on, and wherein the signal includes an indication that the mobile communication device has been powered on; and further comprising the steps of:
- at the service node, determining other lists in which the first user is listed;
- for each of the other lists, determining a corresponding other user; and
- sending a notification to each of the corresponding other users indicating that the first user has gone on-line.

2. A method of notifying a first user of a mobile communication device about status of other users in a mobile communications system, the method comprising the steps of:

sending a signal from the mobile communication device to a service node in the mobile communications system;

at the service node, in response to receipt of the signal, determining a list of other users that the first user wants to know the status of;

at the service node, determining the status of each of the other users on the list; and transmitting the status of each of the other users from the service node to the mobile communication device, wherein the status of each of the other users includes an indication of whether the user is on-line or off-line to the mobile communications system, and wherein the status includes an indication of whether each of the other users on the list is associated with a voicemail service.

3. A method of notifying a first user of a mobile communication device about status of other users in a mobile communications system, the method comprising the steps of:

sending a signal from the mobile communication device to a service node in the mobile communications system;

at the service node, in response to receipt of the signal, determining a list of other users that the first user wants to know the status of;

at the service node, determining the status of each of the other users on the list; and transmitting the status of each of the other users from the service node to the mobile communication device, wherein the status of each of the other users includes an indication of whether the user is on-line or off-line to the mobile communications system, and wherein the status includes an indication of whether each of the other users on the list is associated with an e-mail service.

4. A method of notifying a first user of a mobile communication device about status of other users in a mobile communications system, the method comprising the steps of:

sending a signal from the mobile communication device to a service node in the mobile communications system;

at the service node, in response to receipt of the signal, determining a list of other users that the first user wants to know the status of;

at the service node, determining the status of each of the other users on the list; and transmitting the status of each of the other users from the service node to the mobile communication device, wherein the status of each of the other users includes an indication of whether the user is on-line or off-line to the mobile communications system, and wherein for each of the other users on the list, the status represents a condition that has continued to exist for a predetermined period of time, wherein the predetermined period of time is selected to be at least long enough to substantially prevent any of a number of transient conditions from being reported as status.

5. The method of claim 4, wherein one of the transient conditions is temporarily going off-line because of travel through a tunnel.

6. The method of claim 4, wherein one of the transient conditions is temporarily going off-line because of travel in an elevator.

7. A method of notifying a first user of a mobile communication device about status of other users in a mobile communications system, the method comprising the steps of:

sending a signal from the mobile communication device to a service node in the mobile communications system;

at the service node, in response to receipt of the signal, determining a list of other users that the first user wants to know the status of;

at the service node, determining the status of each of the other users on the list;

transmitting the status of each of the other users from the service node to the mobile communication device, wherein the status of each of the other users includes an indication of whether the user is on-line or off-line to the mobile communications system; and revising the list by:
- at the mobile communication device, receiving revised information about list contents via an input device;
- sending the revised information about list contents from the mobile communication device to the service node; and
- at the service node, revising the list in accordance with the revised information about list contents, wherein the revised information about list contents includes information about another user to be added to the list, and wherein the step of revising the list in accordance with the revised information about another user to be added to the list comprises the steps of:
- sending a message from the service node to a mobile communication device associated with said another user to be added to the list, wherein the message advises that the first user wants to add said another user to the list;
- sending a reply message from the mobile communication device associated with said another user to the service node, wherein the reply message alternatively grants or denies approval; and
- at the service node, revising the list in accordance with the revised information about another user to be added to the list only if the reply message grants approval.

8. A method of notifying other users in a mobile communications system that a first user of a mobile communication device has gone on-line, the method comprising the steps of:
sending a signal from the mobile communication device to a service node in the mobile communications system, wherein the signal indicates that the mobile communication device has gone on-line;
at the service node, in response to receipt of the signal, determining other lists in which the first user is listed;
for each of the other lists, determining a corresponding other user; and
sending a notification to each of the corresponding other users indicating that the first user has gone on-line.

9. The method of claim 8, wherein the service node is a home location register.

10. A method of notifying other users in a mobile communications system that a first user of a mobile communication device has gone off-line, the method comprising the steps of:
sending a signal from the mobile communication device to a service node in the mobile communications system, wherein the signal indicates that the mobile communication device has gone off-line;
at the service node, in response to receipt of the signal, determining other lists in which the first user is listed;
for each of the other lists, determining a corresponding other user; and
sending a notification to each of the corresponding other users indicating that the first user has gone off-line.

11. The method of claim 10, wherein the service node is a home location register.

12. A system for notifying a first user of a mobile communication device about status of other users in a mobile communications system, the system comprising:
means for sending a signal from the mobile communication device to a service node in the mobile communications system;
at the service node, means, responsive to receipt of the signal, for determining a list of other users that the first user wants to know the status of;
at the service node, means for determining the status of each of the other users on the list;
means for transmitting the status of each of the other users from the service node to the mobile communication device,
wherein the status of each of the other users includes an indication of whether the user is on-line or off-line to the mobile communications system,
wherein the means for sending the signal from the mobile communication device to the service node in the mobile communications system operates in response to the mobile communication device being powered on, and
wherein the signal includes an indication that the mobile communication device has been powered on; and
further comprising:
at the service node, means for determining other lists in which the first user is listed;
means for determining a corresponding other user for each of the other lists; and
means for sending a notification to each of the corresponding other users indicating that the first user has gone on-line.

13. A system for notifying a first user of a mobile communication device about status of other users in a mobile communications system, the system comprising:
means for sending a signal from the mobile communication device to a service node in the mobile communications system;
at the service node, means, responsive to receipt of the signal, for determining a list of other users that the first user wants to know the status of;
at the service node, means for determining the status of each of the other users on the list; and
means for transmitting the status of each of the other users from the service node to the mobile communication device,
wherein the status of each of the other users includes an indication of whether the user is on-line or off-line to the mobile communications system, and
wherein the status includes an indication of whether each of the other users on the list is associated with a voicemail service.

14. A system for notifying a first user of a mobile communication device about status of other users in a mobile communications system, the system comprising:
means for sending a signal from the mobile communication device to a service node in the mobile communications system;
at the service node, means, responsive to receipt of the signal, for determining a list of other users that the first user wants to know the status of;
at the service node, means for determining the status of each of the other users on the list; and
means for transmitting the status of each of the other users from the service node to the mobile communication device,
wherein the status of each of the other users includes an indication of whether the user is on-line or off-line to the mobile communications system, and
wherein the status includes an indication of whether each of the other users on the list is associated with an e-mail service.

15. A system for notifying a first user of a mobile communication device about status of other users in a mobile communications system, the system comprising:
means for sending a signal from the mobile communication device to a service node in the mobile communications system;
at the service node, means, responsive to receipt of the signal, for determining a list of other users that the first user wants to know the status of;
at the service node, means for determining the status of each of the other users on the list; and
means for transmitting the status of each of the other users from the service node to the mobile communication device,
wherein the status of each of the other users includes an indication of whether the user is on-line or off-line to the mobile communications system, and
wherein the service node further comprises means for inhibiting a user's status from being updated to indicate a new condition of the user until the new condition has continued to exist for a predetermined period of time, wherein the predetermined period of time is selected to be at least long enough to substantially prevent any of a number of transient conditions from being reported as status.

16. The system of claim 15, wherein one of the transient conditions is temporarily going off-line because of travel through a tunnel.

17. The system of claim 15, wherein one of the transient conditions is temporarily going off-line because of travel in an elevator.

18. A system for notifying a first user of a mobile communication device about status of other users in a mobile communications system, the system comprising:
 means for sending a signal from the mobile communication device to a service node in the mobile communications system;
 at the service node, means, responsive to receipt of the signal, for determining a list of other users that the first user wants to know the status of;
 at the service node, means for determining the status of each of the other users on the list;
 means for transmitting the status of each of the other users from the service node to the mobile communication device,
 wherein the status of each of the other users includes an indication of whether the user is on-line or off-line to the mobile communications system; and
 means for revising the list, comprising:
  at the mobile communication device, means for receiving revised information about list contents from an input device;
  means for sending the revised information about list contents from the mobile communication device to the service node; and
  at the service node, means for revising the list in accordance with the revised information about list contents,
 wherein the revised information about list contents includes information about another user to be added to the list, and
 wherein the means for revising the list in accordance with the revised information about another user to be added to the list comprises:
  means for sending a message from the service node to a mobile communication device associated with said another user to be added to the list, wherein the message advises that the first user wants to add said another to the list;
  means for sending a reply message from the mobile communication device associated with said another user to the service node, wherein the reply message alternatively grants or denies approval; and
  at the service node, means for revising the list in accordance with the revised information about another user to be added to the list only if the reply message grants approval.

19. A system for notifying other users in a mobile communications system that a first user of a mobile communication device has gone on-line, the system comprising:
 means for sending a signal from the mobile communication device to a service node in the mobile communications system, wherein the signal indicates that the mobile communication device has gone on-line;
 at the service node, means, responsive to receipt of the signal, for determining other lists in which the first user is listed;
 means for determining a corresponding other user for each of the other lists; and
 means for sending a notification to each of the corresponding other users indicating that the first user has gone on-line.

20. The system of claim 19, wherein the service node is a home location register.

21. A system for notifying other users in a mobile communications system that a first user of a mobile communication device has gone off-line, the system comprising:
 means for sending a signal from the mobile communication device to a service node in the mobile communications system, wherein the signal indicates that the mobile communication device has gone off-line;
 at the service node, means, responsive to receipt of the signal, for determining other lists in which the first user is listed;
 means for determining a corresponding other user for each of the other lists; and
 means for sending a notification to each of the corresponding other users indicating that the first user has gone off-line.

22. The system of claim 21, wherein the service node is a home location register.

23. A method of notifying a first user of a mobile communication device about status of other users in a mobile communications system, the method comprising the steps of:
 sending a signal from the mobile communication device to a service node in the mobile communications system;
 at the service node, in response to receipt of the signal, determining a list of other users that the first user wants to know the status of;
 at the service node, determining the status of each of the other users on the list; and
 transmitting the status of each of the other users from the service node to the mobile communication device,
 wherein for each of the other users on the list, the status represents a condition that has continued to exist for a predetermined period of time, wherein the predetermined period of time is selected to be at least long enough to substantially prevent any of a number of transient conditions from being reported as status.

24. A system for notifying a first user of a mobile communication device about status of other users in a mobile communications system, the system comprising:
 means for sending a signal from the mobile communication device to a service node in the mobile communications system;
 at the service node, means, responsive to receipt of the signal, for determining a list of other users that the first user wants to know the status of;
 at the service node, means for determining the status of each of the other users on the list; and
 means for transmitting the status of each of the other users from the service node to the mobile communication device,
 wherein the service node further comprises means for inhibiting a user's status from being updated to indicate a new condition of the user until the new condition has continued to exist for a predetermined period of time, wherein the predetermined period of time is selected to be at least long enough to substantially prevent any of a number of transient conditions from being reported as status.

* * * * *